United States Patent [19]

Hino et al.

[11] 4,294,940

[45] Oct. 13, 1981

[54] RESIN COMPOSITION FOR ELECTROCOATING

[75] Inventors: Minoru Hino; Takao Oshima, both of Takatsuki; Kazuo Hayatsu, Ibaraki; Michio Yamamoto, Takatsuki; Seimei Yasui, Takarazuka, all of Japan

[73] Assignee: Sumitomo Chemical Company, Limited, Osaka, Japan

[21] Appl. No.: 110,688

[22] Filed: Jan. 9, 1980

[30] Foreign Application Priority Data

Jan. 12, 1979 [JP] Japan .................. 54-2525
Jul. 19, 1979 [JP] Japan .................. 54-92202
Aug. 23, 1979 [JP] Japan ................ 54-108016

[51] Int. Cl.$^3$ .................. C08G 18/80; C08G 18/62; C25D 13/06
[52] U.S. Cl. .................. 525/124; 204/181 C; 260/29.2 TN; 260/37 N; 528/45; 528/73; 528/75
[58] Field of Search .................. 528/45; 525/124; 260/29.2 TN

[56] References Cited

U.S. PATENT DOCUMENTS

| | | | |
|---|---|---|---|
| 3,883,483 | 5/1975 | Anderson et al. | 528/45 |
| 3,912,566 | 10/1975 | Andrews et al. | 528/45 |
| 3,922,253 | 11/1975 | Jerabek et al. | 528/45 |
| 4,147,676 | 4/1979 | Pampouchidis | 528/45 |
| 4,148,772 | 4/1979 | Marchetti et al. | 528/45 |
| 4,172,193 | 10/1979 | Marx et al. | 528/45 |
| 4,174,333 | 11/1979 | Hartman et al. | 528/45 |

FOREIGN PATENT DOCUMENTS

| | | |
|---|---|---|
| 53-12938 | 6/1978 | Japan . |
| 53-12977 | 6/1978 | Japan . |
| 77/4193 | 7/1977 | South Africa . |
| 77/4194 | 7/1977 | South Africa . |
| 1409728 | 10/1975 | United Kingdom . |
| 1449839 | 9/1976 | United Kingdom . |

*Primary Examiner*—H. S. Cockeram
*Attorney, Agent, or Firm*—Birch, Stewart, Kolasch and Birch

[57] ABSTRACT

A resin composition for electrocoating which comprises (I) a reaction product (G) of an epoxy compound (E), optionally an epoxy group-modifying agent (F) and a partially esterified and/or partially amidated product (D) which is obtained by partially esterifying and/or partially amidating an adduct (A) of a conjugated diene polymer with an $\alpha,\beta$-unsaturated dicarboxylic acid or its anhydride with an alcoholic hydroxy group-containing compound (B) and/or a primary or secondary monoamine (C), respectively, and (II) a completely blocked organic polyisocyanate, said mixture of the reaction product (G) and the completely blocked organic polyisocyanate being neutralized, or a neutralized product of an adduct (H) of the reaction product (G) with a partially blocked organic polyisocyanate.

The resin composition is applicable to electrocoating, particularly cathodic electrocoating, and hence, is useful for electrocoating of steel products, particularly for electrocoating of automobiles.

10 Claims, No Drawings

RESIN COMPOSITION FOR ELECTROCOATING

The present invention relates to a resin composition for electrocoating wherein a conjugated diene polymer is used as one of the starting materials.

Conjugated diene polymers, especially butadiene polymer, are mainly used for an anodic electrocoating, particularly in the industrial coating of automobiles (cf. Japanese Patent Publication No. 24532/1976, and Japanese Patent Publication (unexamined) Nos. 150597/1976, 102347/1977 and 3436/1972, which are concerned with resin compositions for the anodic electrocoating).

Recently, a resin composition for cathodic electrocoating has been developed. Since the resin composition for cathodic electrocoating can give a coating film having excellent anticorrosion capability, the cathodic electrocoating method tends to be used instead of the anodic electrocoating method using butadiene polymer. The resin composition for cathodic electrocoating comprises mainly an addition product of an epoxy compound and an amine compound and a blocked organic polyisocyanate, and hence, the coating film obtained from the resin composition has a high crosslink density and a high adhesion onto steel panels, and hence, the coating film possesses extremely high anticorrosion resistance.

It is also proposed to use conjugated diene polymers, i.e. butadiene polymer, as a cathodic electrocoating composition (cf. Japanese Patent Publication (unexamined) Nos. 16048/1978, 8629/1978, 119727/1976, 147638/1977 and 63439/1978). According to this method, the butadiene polymer is merely applied to the cathodic electrocoating, but the essential defect of the butadiene polymer, i.e. inferior adhesion onto steel panels in comparsion with the epoxy resin composition, is not improved.

The adhesion between the coating film and the steel panels is one of the evaluation items of anticorrosion, but it is very important as the properties of the coating film for automobile. The adhesion is usually tested by a cellophane tape peel test. It has been found that when the resin compositions as disclosed in Japanese Patent Publication (unexamined) Nos. 16048/1978, 8629/1978 and 119727/1976 are electrocoated onto a dull steel panel, the coating film shows an adhesion of less than 72 hours in the tape peel test.

In order to improve the properties of the epoxy resin composition, a resin composition for cathodic electrocoating is prepared by mixing an amino epoxy compound, an imidated product of an adduct of a conjugated diene polymer with an α,β-unsaturated dicarboxylic acid or its anhydride and a blocked toluene diisocyanate. When the resin composition is subjected to cathodic electrocoating, it has been found that resin composition is inferior in the compatibility with epoxy compounds and the baked coating film is deposited with scattered particles and possesses an uneven surface. Further the anticorrosion of the coating film is rapidly decreased when a modified conjugated diene polymer is added thereto in an amount of 5% by weight or more.

As a result of an intensive study by the present inventors, it has been found that when an adduct of a conjugated diene polymer with an α,β-unsaturated dicarboxylic acid or its anhydride is reacted with an alcoholic hyroxy group-containing compound and/or a primary or secondary monoamine and then the reaction product is reacted with an epoxy compound, there can be obtained a homogeneous, transparent resin composition which is not gelated even at an acid value of lower than 10, or even lower than 2, and futher that when the resin composition is further subjected to amination and the aminated composition is admixed with a blocked organic diisocyanate and then neutralized with an aicd, there can be obtained a resin composition which can give a homogeneous coating film by electrocoating, washing with water and then baking. The coating film thus obtained has an anticorrosion of more than 100 hours in case of a thickness of 20µ of the coating film (without colorant). Thus, the resin composition shows improved properties not only in anticorrosion but also in impact strength and bending resistance in the Erichsen test (the conventional epoxy resin composition for the cathodic electrocoating are inferior in these impact strength and bending resistance in Erichsen test).

An object of the present invention is to provide a resin composition for electrocoating which has further improved anticorrosive and coating properties. Another object of the present invention is to provide an improved epoxy resin composition which can give an excellent electrocoating film having an excellent adhesion onto steel panels. These and other objects and advantages of the invention will be apparent to persons skilled in the art from the following description.

The resin composition for electrocoating of the present invention comprises (I) a reaction product (G) of an epoxy compound (E), optionally an epoxy group-modifying agent (F) and a partially esterified and/or partially amidated product (D) which is obtained by partially esterifying and/or partially amidating an adduct (A) of a conjugated diene polymer with an α,β-unsaturated dicarboxylic acid or its anhydride with an alcoholic hydroxy group-containing compound (B) and/or a primary or secondary monoamine (C), respectively, and (II) a completely blocked organic polyisocyanate, said mixture of the reaction product (G) and the completely blocked organic polyisocyanate being neutralized.

Alternatively, the resin composition may comprises a neutralized product of an adduct of the reaction product (G) with a partially blocked organic polyisocyanate.

The conjugated diene polymers used in the present invention are conjugated diene polymers having a number average molecular weight of 150 to 50,000, preferably 500 to 5,000, which include a conjugated diene homopolymer and a conjugated diene copolymer. The micro structure of the double bond thereof does not matter, but the polymers may contain the optional ratios of 1,4-bond, 1,2-bond or 3,4-bond. Besides, the conjugated diene polymers may contain a functional group selected from the group consisting of OH, COOH, a halogen, and an amino group of the formula: $NR_2$ wherein R is hydrogen or a hydrocarbon group having 1 to 20 carbon atoms on one or both terminals, which can be controlled by the type of the polymerization initiation and the stopping of the polymerization reaction. The conjugated diene polymer of the present invention includes also a conjugated diene polymer which is chain-transferred with toluene, α-olefin, or the like.

The conjugated diene homopolymers include polybutadiene, polyisoprene, poly(1,3-pentadiene), polycyclopentadiene, polychloroprene, poly(2,3-dimethylbutadiene), or the like.

The conjugated diene copolymers mean compolymers of a conjugated diene monomer and other copolymerizable monomers and also copolymers of two or more of the conjugated diene monomers.

The conjugated diene monomer includes butadiene, isoprene, 1,3-pentadiene, chloroprene, 2,3-dimethylbutadiene, cyclopentadiene, cyclohexadiene, cyclooctadiene-1,3, or the like. The conjugated diene monomer is contained in an optional ratio in the copolymer.

Other copolymerizable monomers include vinyl monomers, aromatic group-substituted vinyl monomers, α-olefins, acetylenes, dicyclopentadiene, norbornene derivatives, or the like.

The vinyl monomers include acrylic acid, methacrylic acid, methyl acrylate, ethyl acrylate, butyl acrylate, octyl acrylate, hexyl acrylate, methyl methacrylate, ethyl methacrylate, butyl methacrylate, propyl methacrylate, hexyl methacrylate, octyl methacrylate, dodecyl methacrylate, hydroxyethyl methacrylate, hydroxyethyl acrylate, vinyl acetate, vinyl propionate, vinyl butyrate, vinyl chloride, vinyl fluoride, vinylidene chloride, vinylidene fluoride, maleic acid, maleic anhydride, maleic acid esters, maleic acid diesters, acrylonitrile, methacrylonitrile, vinylpyridiene, acrylamide, vinylcyclohexene, N-vinylpyrrolidone, or the like.

The aromatic group-substituted vinyl monomers include styrene, α-methylstyrene, vinyltoluene, chlorostyrene, αp-dimethylstyrene, isopropenyltoluene, or the like.

The α-olefins include ethylene, propylene, butene-1, pentene-1, hexene-1, heptene-1, octene-1, nonene-1, decene-1, dodecene-1, or the like.

The acetylenes include acetylene, methylacetylene, phenylacetylene, propargyl bromide, propargyl chloride, or the like.

The norbornene derivatives include norbornene, 5-vinylnorbornene, 5-ethylidenenorbornene, 5-chloronorbornene, 5-phenylnorbornene, or the like.

These copolymerizable monomers may be used alone or in a combination of two or more thereof. Thus, the conjugated diene copolymers include such multidimensional polymers. The copolymers contain preferably the conjugated diene monomer in the ratio of 20% by mol or more, more preferably 50% by mol or more.

The α,β-unsaturated dicarboxylic acid or its anhydride includes maleic acid, fumaric acid, itaconic acid, citraconic acid, or the like, or thier anhydride. The anhydrides are preferable.

The alcoholic hydroxy group-containing compound (B) to be used for the addition reaction or dehydration condensation reaction with the adduct (A) includes alcohols, hydroxy group-containing acrylic acid esters or methacrylic acid esters, tertiary amino group-containing aminoalcohols, or the like.

The alcohols include aliphatic alcohols, halogen-containing alcohols, aromatic alcohols, or the like.

The aliphatic alcohols have preferably 1 to 20 carbon atoms. Suitable examples of the aliphatic alcohols are primary alcohols such as methanol, ethanol, propanol, allyl alcohol, butanol, amyl alcohol, isoamyl alcohol, neopentyl alcohol, hexyl alcohol, isohexyl alcohol, n-octyl alcohol, 2-ethylhexyl alcohol, nonyl alcohol, decyl alcohol, dodecyl alcohol, myristyl alcohol, oleyl alcohol, and stearyl alcohol; secondary alcohols such as 2-propanol, 2-butanol, 3-methyl-2-butanol, 2-pentanol, 3-pentanol, 2-hexanol, 3-hexanol, 4-heptanol, 2-octanol, 2-nonanol, and 2-tridecanol; and tertiary alcohols such as tert-butanol.

The aliphatic alcohols include also ethylene glycol derivatives, i.e. ethylene glycol monoethers or monoesters, such as ethylene glycol monomethyl ether, ethylene glycol monoethyl ether, ethylene glycol monobutyl ether, ethylene glycol monopropyl ether, ethylene glycol monophenyl ether, ethylene glycol monobenzyl ether, ethylene glycol monoacetate, ethylene glycol monoacrylate, and ethylene glycol monomethacrylate. The aliphatic alcohols include also divalent alcohols such as ethylene glycol, propylene glycol, trimethylene glycol, tetramethylene glycol, pentamethylene glycol, 2,5-dihydroxyhexane, and 1,2-cyclohexanediol; and trivalent alcohols such as glycerine, and trimethlolpropane.

The halogen-containing alcohols have preferably 1 to 20 carbon atoms and include chlorobenzyl alcohol, trichloroethanol, α,β-dichlorohydrine, or the like. The aromatic alcohols have preferably 7 to 20 carbon atoms and include benzyl alcohol, phenylethyl alcohol, or the like.

The hydroxy group-containing acrylic acid esters or methacrylic acid esters are preferably esters of an alkyl having 1 to 6 carbon atoms and include 2-hydroxyethyl acrylate, 2-hydroxypropyl acrylate, 2-hydroxyethyl methacrylate, 2-hydroxypropyl methacrylate, or the like.

The tertiary amino group-containing aminoalcohols have preferably 3 to 20 carbon atoms and include dimethylaminoethanol, diethylaminoethanol, dipropylaminoethanol, dibutylaminoethanol, dihexylaminoethanol, dioctylaminoethanol, N-hydroxyethylmorpholine, diphenylaminoethanol, dibenzylaminoethanol, dimethylaminopropanol, diethylaminopropanol, N-hydroxyethylimidazoline, and other compounds having a tertiary amino and hydroxy groups in the molecule.

The primary or secondary monoamines (C) include primary monoamines having preferably 1 to 6 carbon atoms, such as propylamine, butylamine, hexylamine, or the like; and secondary amines having preferably 2 to 20 carbon atoms, i.e. dialkylamines such as dimethylamine, diethylamine, dipropylamine, dibutylamine, dipentylamine, dihexylamine, or dioctylamine, and dialkanolamines such as dimethylolamine, diethanolamine, or dipropanolamine, among which the secondary monoamines, particularly dialkylamines, are preferable.

The epoxy compounds (E) include epoxy compounds containing one or more epoxy groups per one molecule. Suitable examples of the epoxy compounds containing one epoxy group per one molecule are phenyl glycidyl ether, epichlorohydrin, propylene oxide, ethylene oxide, styrene oxide, isobutylene oxide, allyl glycidyl ether, glycidyl acrylate, glycidyl methacrylate, or the like. Suitable examples of epoxy compounds containing two or more epoxy groups per one molecule are an epoxy compound obtained from bisphenol A and epichlorohydrin; epoxy compounds obtained from hydrogenated bisphenol A and epichlorohydrin, or from bisphenol A and β-methylepichlorohydrin; novolak resin polyglycidyl ether; polyglycidyl ethers of polyvalent alcohols (e.g. ethylene glycol, propylene glycol, glycerine, or trimethylolpropane); polyglycidyl esters of polycarboxylic acids (e.g. adipic acid, phthalic acid, or dimer acids); epoxy compounds of natural drying oils or semi-drying oils; or the like.

The epoxy group-modifying agent (F) is a compound having at least one, preferably one or two, of an active hydrogen atom within the molecule, such as primary amines, secondary amines, monocarboxylic acids, dicarboxylic acids, and bifunctional phenolic hydroxy group-containing compounds.

The primary amines have preferably 1 to 20 carbon atoms and include aromatic, aliphatic or alicyclic monoamines and polyvalent amines which may be substituted with an alcoholic hydroxy group. Suitable examples of the aromatic amines are anilines having a substituent on the nucleus, such as aniline, toluidine, ethylaniline, p-isopropylaniline, p-tert-butylaniline, p-tert-pentylaniline, xylidine, 2-isopropyl-5-methylaniline, 2,4,5-trimethylaniline, 2,4,6-trimethyaniline, pentamethylaniline, vinylaniline, chloroaniline, anisidine, phenetidine, or aminobenzonitrile; aralkylamines such as benzylamine, α-methylbenzylamine, phenethylamine, 3,4,5-trimethoxyphenethylamine, α-naphthylamine, β-naphthylamine, tetrahydronaphthylamine, or anthrylamine.

The aliphatic monoamines include aliphatic saturated or unsaturated amines, such as methylamine, ethylamine, n-propylamine, isopropylamine, butylamine, isobutylamine, sec-butylamine, tert-butylamine, pentylamine, isopentylamine, tert-pentylamine, hexylamine, heptylamine, octylamine, 2-ethylhexylamine, nonylamine, decylamine, vinylamine, or allylamine. Suitable examples of the alicyclic amines are cyclohexylamine, or the like.

The alcoholic hydroxy group-substituted amines include aminoalcohols such as monoethanolamine, 2-amino-1-butanol, 2-amino-2-methyl-1-propanol, or 2-amino-2-methyl-1,3-propanediol.

Suitable examples of the primary polyvalent amines are ethylenediamine, propylenediamine, hexamethylenetetramine, hexamethylenediamine, diethylenetriamine, triethylenetetramine, tetraethylenepentamine, dipropylenetriamine, diethylethylenediamine, or the like.

The secondary amines have preferably 2 to 20 carbon atoms and include aromatic, aliphatic or alicyclic amines which may be substituted with an alcoholic hydroxy group, such as dimethylamine, dipropylamine, dibutylamine, diethanolamine, dipropanolamine, or the like.

Other amines such as pyrrolidine, morpholine, N-aminoethanolamine, diethylaminopropylamine, hydroxyethylamino propylamine, or the like may also be used.

The monocarboxylic acids for the epoxy group-modifying agent have 1 to 22 carbon atoms and include aliphatic saturated monocarboxylic acids such as formic acid, acetic acid, propionic acid, butyric acid, valeric acid, pivalic acid, caproic acid, heptic acid, caprylic acid, capric acid, lauric acid, myristic acid, palmitic acid, stearic acid, cyanoacetic acid, monochloroacetic acid, dichloroacetic acid, or trichloroacetic acid; aliphatic unsaturated monocarboxylic acids such as acrylic acid, crotonic acid, vinylacetic acid, methacrylic acid, allylacetic acid, oleic acid, erucic acid, sorbic acid, linoleic acid, eleostearic acid, linolenic acid, or acetylenecarboxylic acid; and aromatic monocarboxylic acids such as benzoic acid which may be substituted with a halogen, cyano or hydroxy group, phenylacetic acid, or cinnamic acid.

The dicarboxylic acids for the epoxy group-modifying agent have preferably 2 to 12 carbon atoms and include aliphatic saturated or unsaturated dicarboxylic acids or their anhydrides, aromatic dicarboxylic acids or their anhydrides, and alicyclic dicarboxylic acids. Suitable examples of the aliphatic saturated dicarboxylic acids or their anhydrides are oxalic acid, malonic acid, succinic acid, glutaric acid, adipic acid, pimelic acid, suberic acid, azelaic acid, sebacic acid, succinic anhydride, or the like. Suitable examples of the aliphatic unsaturated dicarboxylic acids or their anhydrides are maleic acid, fumaric acid, citraconic acid, mesaconic acid, glutaconic acid, itaconic acid, allylmalonic acid, isopropylidenesuccinic acid, acethylenecarboxylic acid, succinic anhydride, maleic anhydride, citraconic anhydride, or the like. Suitable examples of the aromatic dicarboxylic acids or their anhydrides are phthalic acid, isophthalic acid, terephthalic acid, or phthalic anhydride, which may be substituted with one or two groups selected from halogen, cyano and hydroxy groups.

The bifunctional phenolic hydroxy group-containing compounds for the epoxy group-modifying agent have preferably 6 to 15 carbon atoms and include catechol, resorcinol, hydroquinone, bisphenol A, bisphenol S, or the like.

These epoxy group-modifying agents may be used alone or in a combination of two or more thereof.

The organic polyisocyanate includes aliphatic or aromatic diisocyanates such as m- or p-phenylene diisocyanate, 4,4'-diphenylmethane diisocyanate, 2,4- or 2,6-tolylene diisocyanate, m- or p-xylylene diisocyanate, hexamethylene diisocyanate, dimer acid diisocyanate, or isophorone diisocyanate; adducts of one or two of these aliphatic or aromatic diisocyanates with a polyol such as ethylene glycol, propylene glycol, glycerine, trimethylolpropane, or pentaerythritol; and trimers of the above aliphatic or aromatic diisocyanates.

The blocking agents for blocking the organic polyisocyanates include all conventional blocking agents, for instance, aliphatic or aromatic monoalcohols having preferably 1 to 18 carbon atoms, such as methanol, ethanol, propanol, butanol, hexanol, heptanol, octanol, nonyl alcohol, decanol, dodecanol, hexadecanol, allyl alcohol, crotyl alcohol, propargyl alcohol, cyclohexanol, benzyl alcohol, ethlene glycol monoethyl ether, or ethylene glycol monobutyl ether; oximes such as acetoxime, or methyl ethyl ketone oxime; and active hydrogen compounds such as ethyl acetoacetate. The blocking agents include also hydroxy group-containing acrylic acid esters or methacrylic acid esters, such as 2-hydroxyethyl acrylate, 2-hydroxypropyl acrylate, 2-hydroxyethyl methacrylate, or 2-hydroxypropyl methacrylate; and also alkanolamines such as ethanolamine, diethanolamine, dimethylolamine, dipropanolamine, N,N-dimethylaminoethanol, N,N-diethylaminoethanol, N,N-dibutylaminoethanol, N-methyldiethanolamine, N-ethyldiethanolamine, N-propyldiethanolamine, N-butyldiethanolamine, N-methyldimethylolamine, N-ethyldimethylolamine, or N-propyldimethylolamine.

These blocking agents may be used alone or in a combination of two or more thereof, but when the reaction product (G) contains none or only a few basic amino groups, it is preferable to use a blocking agent which contains a tertiary nitrogen in the form of an amino group in order to exhibit more electrophoretic properties.

The neutralization of the reaction product (G) or the adduct (H) is carried out with an acid selected from organic acids having preferably 1 to 10 carbon atoms, such as organic carboxylic acids (e.g. formic acid, acetic acid, propionic acid, butyric acid, hexylic acid, 2-ethylhexylic acid, lactic acid, hydroxyacetic acid, or oxalic acid), or organic sulfonic acids (e.g. benzensulfonic acid); and inorganic acids (e.g. phosphoric acid, hydrochloric acid, sulfuric acid, or boric acid), among which organic acids, particularly organic carboxylic acids, are preferable.

The adduct (A) of a conjugated diene polymer with an α,β-unsaturated dicarboxylic acid or its anhydride is prepared by known processes, for instance a process as disclosed in U.S. Pat. No. 4,080,493. That is, the conjugated diene polymer is mixed with the α,β-unsaturated dicarboxylic acid or its anhydride and the mixture is reacted at 50° to 300° C. for 30 minutes to 20 hours. Conventional antigelling agents may optionally be used in the reaction in an amount of 0.01 to 10% by weight, preferably 0.01 to 2% by weight, based on the total weight of the reaction system.

The α,β-unsaturated dicarboxylic acid or its anhydride is usually used in such an amount that the content of the dicarboxylic acid in the adduct (A) becomes 3 to 50% by weight, preferably 5 to 25% by weight, based on the total weight of the adduct (A).

The alcoholic hydroxy group-containing compound (B) to be added to the adduct (A) is used in such an amount that the sum of the molar number of the compound (B) and that of the monoamine (C) becomes 0.01 to 10 mol, preferably 0.1 to 2 mol, more preferably 0.7 to 1.2 mol, per 1 mol of the α,β-unsaturated dicarboxylic acid or its anhydride. The monoamine (C) is used in an amount of 0 to 100% of the sum of the compound (B) and the monoamine (C). In other words, the alcoholic hydroxy group-containing compound (B) and the primary or secondary monoamine (C) may either be used alone or both of them are used together in any ratio.

The partial esterification or amidation reaction of the adduct (A) with the compound (B) and/or the monoamine (C) may be carried out at a temperature of 0° to 250° C., preferably 30° to 180° C., for 30 minutes to 5 hours. Unreacted amines may be separated from the reaction mixture, or the reaction mixture may be subjected to the subsequent reaction without separating the unreacted amines unless an undesirable effect is given thereby.

In the reaction product (D) obtained by the partial esterification or partial amidation of the adduct (A) with the alcoholic hydroxy group-containing compound (B) and/or the primary or secondary monoamine (C), 20 to 80%, preferably 45 to 65%, of the total acid values of the adduct (A) is esterified or amidated, and the remaining carboxylic acids are subsequently subjected to the reaction with an epoxy compound (E).

The partially esterified and/or partially amidated product (D) thus obtained is further reacted with an epoxy compound (E) and the excess group is optionally, partially or wholly reacted with an epoxy group-modifying agent such as amines or monocarboxylic acids to give a reaction product (G).

The modification of the epoxy compound (E) with the epoxy group-modifying agent (F) may be carried out in the following manners. That is, the epoxy compound (E) is firstly modified with the epoxy group-modifying agent (F) and then is subjected to the reaction with the product (D); or the epoxy compound (E), the product (D) and the epoxy groupmodifying agent (F) are simultaneously reacted; or the product (D) and the epoxy compound (E) are firstly reacted and thereafter the epoxy group-modifying agent (F) is reacted.

When the epoxy compound (E) is a hydroxy group-containing epoxy compound, it may be reacted with the product (D) as it is, or when the epoxy compound (E) is a low molecular weight compound containing only a few hydroxy groups, it may be reacted with the product (D) after subjection to a partial ring opening reaction with an epoxy group-modifying agent (F) to produce hydroxy groups and further subjecting the resulting compound to an addition reaction with a partially blocked organic polyisocyanate.

The product (D) is reacted in an amount of 5 to 200 parts by weight, preferably 10 to 100 parts by weight, per 100 parts by weight of the epoxy compound (E).

When the epoxy group-modifying agent (F) is used, the epoxy resin is given by an appropriate polarity and the molecular weight of the resin is increased. Besides, when the used epoxy group-modifying agents are amines, the main chain of the epoxy resin has a cationic activity, and further, when amines having different basicities are used, there can be obtained resins having unexpectedly improved resin properties. For instance, the resin composition obtained from such a resin can give a coating film which is colorless or having only a faint color and having excellent anticorrosion properties, even when being baked at a low temperature such as 160° C., and further, the coating film exhibits extremely improved properties such as smoothness, gloss and chemical resistance.

The epoxy group-modifying agent (F) is reacted with the epoxy compound (E) in such an amount that the active hydrogen of the epoxy group-modifying agent becomes 0.2 to 1.0 atomic equivalent, preferably 0.5 to 1.0 atomic equivalent, per one equivalent of the epoxy group. More preferably, an epoxy group-modifying agent having two active hydrogens is reacted with the epoxy compound (E) in an amount of 0.2 to 0.9 atomic equivalent, particularly 0.3 to 0.8 atomic equivalent, per one equivalent of the epoxy group.

Besides, when amines are used as the epoxy group-modifying agent, a cationic group can freely be introduced into the epoxy compound by selecting appropriately the reaction ratio, and the cationic group thus introduced may be used as a part or whole of the cationic site which is necessary to give the final resin hydrophilic nature. Control of the reaction ratio contributes also to the regulation of the molecular weight of the resin.

When the addition reaction of the carboxyl group of the product (D) and the epoxy compound (E) and/or the epoxy group-modifying agent (F) is carried out in the presence of an amine, an addition of the amine into the epoxy compound simultaneously proceeds. When carboxylic acids are used as the epoxy group-modifying agent (F), the reaction of the carboxylic acids with the epoxy group is carried out by a conventional method, e.g. at a temperature of 0° to 250° C., preferably 30° to 180° C., in the presence of a basic catalyst. When phenolic hydroxy group-containing compounds (e.g. bisphenol A) are used, the reaction of the phenolic hydroxy group-containing compound with the epoxy group is carried out at a temperature of 100° to 250° C., preferably 130° to 190° C. When amines are used as the epoxy group-modifying agent (F), the reaction of the amines with the epoxy group is carried out by a conventional method, e.g. at a temperature of 0° to 200° C., preferably 30° to 180° C. When an excess amount of epoxy group is present, monocarboxylic acids may optionally be further reacted in an amount of equivalent or less to the excess amount of the epoxy group.

The reaction product (G) thus obtained is further mixed with a completely blocked organic polyisocyanate or is further reacted with a partially blocked organic polyisocyanate.

The amino group contained in the reaction product (G) or in the organic polyisocynate is neutralized with an organic or inorganic acid, and thereby, the product becomes cationic and excellent properties as a composition for electrocoating. Thus, the mixture of the reaction product (G) and the organic polyisocyanate is regulated so as to have an amine value of the solid component of 10 to 150, preferably 25 to 100. Said amine value is shown by the weight (mg) of potassium hydroxide (KOH) equivalent to hydrochloric acid which is necessary to neutralize 1 g of the resin. The regulation of the amine value can easily be done by controlling the amount of amines used as the epoxy group-modifying agent and the blocking agent of the polyisocyanate. When a partially blocked organic polyisocyanate is used, the reaction product is preferably controlled so that the amine value becomes within the above range.

When the reaction product (G) is mixed with the completely blocked organic polyisocyanate, the neutralization may be done before mixing them or after mixing. When the reaction product (G) is reacted with a partially blocked organic polyisocyanate, it is preferable to neutralize the reaction product.

The partially blocked organic polyisocyanate having a free isocyanate group is usually used in an amount of 5 to 300 parts by weight, preferably 10 to 100 parts by weight, to 100 parts by weight of the reaction product (G). The reaction of the partially blocked organic polyisocyanate and the reaction product (G) is usually carried out at a temperature of 20° to 140° C. for 10 minutes to 10 hours.

The partially blocked organic polyisocyanate is prepared by reacting 0.6 to 2 mol, preferably 0.8 to 1.2 mol, of an organic polyisocyanate with 1 mol of a blocking agent at a temperature of 0° to 200° C., preferably 20° to 140° C.

The completely blocked organic polyisocyanate is prepared by wholly blocking the isocyanate groups contained in the organic polyisocyanate with a blocking agent. The completely blocked organic polyisocyanate is usually used in an amount of 5 to 200 parts by weight, preferably 10 to 100 parts by weight, to 100 parts by weight of the reaction product (G).

The resin composition is dispersed into water optionally together with conventional colorants and other various additives such as surfactants and wetting agents which are usually used in the preparation of paints to obtain an aqueous dispersion for electrocoating.

The colorants include iron oxide, tin silicate, tin oxide, strontium chromate, carbon black, titanium white, talc, kaolin, barium sulfate, cadmium yellow, cadmium red, chromium yellow, or the like.

The colorants are usually incorporated in an amount of the colorant:the resin of the composition=0.01 to 5:1 by weight. The other additives are usually incorporated in an amount of 0.01 to 4% by weight based on the weight of resin of the composition.

When the resin composition of the present invention is subjected to the electrocoating, a coating film is formed on the steel plate connected to the cathode. The coating film thus formed is usually washed with water and then baked and cured at a temperature of 150° to 250° C., preferably 170° to 200° C. During the curing step, the blocking agent contained in the blocked organic polyisocyanate is isolated and evaporated, and the resulting free isocyanate group is chemically bonded to the hydroxy group contained in the resin composition, by which curing owing to the crosslinking reaction of double bonds occurs simultaneously, and hence, the coating film shows more excellent properties.

The resin composition for electrocoating of the present invention shows an excellent anticorrosion even when applied to non-treated steel panels, and shows particularly excellent peeling resistance and excellent adhesion in an anticorrosion test (i.e. a tape peel test).

The present invention is illustrated by the following Examples but is not limited thereto.

Preparation 1

Preparation of Liquid Maleinated Polybutadiene (1) Into a one liter flask provided with a stirrer, a thermometer, a condenser and an inert gas-introducing cock are charged a liquid polybutadiene (number average molecular weight: 1,700, micro structure of double bonds; cis-1,4 structure: 75%, trans-1,4 structure: 24% and vinyl structure: 1%, viscosity: 630 cps at 20° C., iodine value (Wijs method): 420, 540 g), maleic anhydride (60 g) and iron naphthenate (Fe=5%, 2.4 g), and the mixture is reacted under nitrogen gas at 190° C. for 4 hours to give a maleic anhydride adduct (A) (total acid value: 109) (hereinafter, referred to as "MLB-1").

(2) Into a one liter four-necked flask provided with the same equipment as used in the above (1) are charged a liquid polybutadiene (number average molecular weight: 1,050, micro structure of double bonds; cis-1,4 structure: 71%, trans-1,4 structure: 26% and vinyl structure: 3%, viscosity: 210 cps at 20° C., iodine value: (Wijs method): 490, 551 g), maleic anhydride (49 g) and iron naphthenate (2.4 g), and the mixture is reacted likewise to obtain a maleic anhydride adduct (A) (total acid value: 89.0) (hereinafter, referred to as "MLB-2").

(3) In the same manner as described in the above (1), a maleic anhydride adduct (A) (total acid value: 150) (hereinafter, referred to as "MLB-3") is prepared from a liquid polybutadiene (number average molecular weight: 600, micro structure of double bonds; cis-1,4 structure: 31%, trans-1,4 structure: 64%, vinyl structure: 5%, viscosity: 50 cps at 30° C., iodine value: 449, 516 g), maleic anhydride (84 g) and α-phenylnaphthylamine (Antigen PA, a trademark of Sumitomo Chemical Co., Ltd. 180 mg).

Preparation 2

Preparation of Ring-Opened Product of Liquid Maleinated Polybutadiene (1) Into a 500 ml four-necked flask provided with a stirrer, a thermometer, a condenser and an inert gas-introducing cock are charged the liquid maleinated polybutadiene (MLB-1, 200 g), ethylene glycol monoethyl ether acetate (hereinafter, referred to as "EGA", 97 g), 2-hydroxyethyl methacrylate (hereinafter, referred to as "HEMA", 26.5 g), phenothiazine (0.1 g) and N,N-dimethylbenzylamine (hereinafter, referred to as "DMBA", 2.7 g), and the mixture is reacted at 80° C. for 2.5 hours, by which the total acid value becomes 33.0 and the acid anhydride group is ring-opened and is almost semi-esterified. (This product is hereinafter referred to as "MLB-1E").

(2) Into the same apparatus as used in the above (1) are charged the liquid maleinated polybutadiene (MLB-1, 200 g), EGA (93.5 g) and N,N-dimethylaminoethanol (18.2 g), and the mixture is reacted under nitrogen gas at 110° C. for 2 hours, by which the total acid value of the reaction system becomes 34.5 and the product is almost semi-esterified. (This product is hereinafter referred to as "MLB-1AE").

(3) In the same manner as described in the above (1), the liquid maleinated polybutadiene (MLB-2, 200 g), EGA (96 g), HEMA (21.6 g), phenothiazine (1 g) and DMBA (2.2 g) are reacted at 80° C. for 3 hours, by which the total acid value of the reaction mixture becomes 28.0. (This product is hereinafter referred to as "MLB-2E").

(4) In the same manner as described in the above (1), the liquid maleinated polybutadiene (MLB-3, 200 g), EGA (103 g), HEMA (37.2 g), phenothiazine (0.1 g) and DMBA (3.8 g) are reacted at 80° C. for 3 hours, by which the total acid value of the reaction system becomes 43.0. (This product is hereinafter referred to as "MLB-3E").

(5) In the same manner as described in the above (1), the liquid maleinated polybutadiene (MLB-1, 200 g), EGA (92 g) and diethylamine (14.9 g) are reacted under nitrogen gas at 75° C. for 2 hours, by which the total acid value of the reaction system becomes 34.9. It is confirmed from the acid value and infrared spectrum that an amido bond is formed. (This product is hereinafter referred to as "MLB-1AM").

(6) In the same manner as described in the above (1), the liquid maleinated polybutadiene (MLB-1, 200 g), EGA (98.2 g), 2-ethylhexanol (26.5 g) and DMBA (2.7 g) are reacted at 80° C. for 3 hours, by which the total acid value of the reaction system becomes 33.0 and it is almost semiesterified. (This product is hereinafter referred to as "MLB-1EE").

EXAMPLE 1

Into a 500 ml flask provided with a stirrer, a thermometer, a condenser and an inert gas-introducing cock are charged a bisphenol A type epoxy resin (Sumiepoxy ELA-128, a tradename of Sumitomo Chemical Co., Ltd., epoxy equivalent: 184–194, 120.5 g), benzylamine (11.4 g), EGA (68.0 g), phenothiazine (0.2 g), MLB-1E (69,4 g) and diethylamine (8.5 g), and the mixture is reacted under nitrogen gas at 90°–100° C. for 3 hours, by which the total acid value becomes smaller than 1. Acrylic acid (13.0 g) and acetic acid (5.7 g) are further charged into the flask, and the mixture is reacted at the same temperature for 4 hours, whereby the reaction mixture shows an acid value of 1.0.

To the reaction mixture is added a separately prepared solution of semi-blocked tolylene diisocyanate in EGA (110 g) with a dropping funnel at 90° C. over a period of 30 minutes, and the mixture is stirred for 3 hours at the same temperature, in which the free NCO of the reaction mixture is 0%.

To the resin composition thus obtained (350 g) are added di-n-butyl tin dilaurate (hereinafter, referred to as "DBTL", 5.7 g), acetic acid (7.0 g) and deionized water to give a solution for electrocoating which has a solid (resin) content of 15% by weight.

The composition was subjected to the electrocoating under the conditions as shown in Table 1. and various properties of the coating film obtained therefrom were measured. The results are shown in Table 1.

The solution of semi-blocked tolylene diisocyanate used in the above Example 1 is prepared as follows.

Tolylene diisocyanate (2,4-tolylene diisocyanate/2,6-tolylene diisocyanate = 80/20, hereinafter referred to as "TDI", 174 g) and EGA (130 g) are mixed, and to the stirred mixture is added dropwise HEMA (130 g, wherein phenothiazine (0.13 g) is dissolved) under nitrogen gas at 20°–45° C. over a period of 1 hour. After finishing the dropping of HEMA, the mixture is heated to 60° C. in 30 minutes and is stirred at the same temperature for 1.5 hour. It is confirmed that the product contains NCO of 9.6% (measured by di-n-butylamine-hydrochloric acid titration method) and an isocyanate product semi-blocked with HEMA is produced.

EXAMPLE 2

In the same manner as described in Example 1, Sumiepoxy ELA-128 (118 g), malonic acid (13.1 g), MLB-2E (80 g), diethylamine (16.0 g) and EGA (66.1 g) are reacted with stirring at 85°–90° C., by which the acid value becomes smaller than 1, and thereto is added acrylic acid (7.1 g) and the mixture is stirred at the same temperature, by which the acid value becomes 0.7.

To the reaction mixture is added the same HEMA-semi-blocked TDI solution in EGA (180 g) as used in Example 1 and the mixture is reacted in the same manner as described in Example 1 at 85°–90° C. until the NCO of the product becomes nearly zero.

To the resin composition thus obtained (400 g) are added DBTL (6.5 g), acetic acid (6.8 g) and deionized water to give a solution for electrocoating which has a solid content of 15% by weight.

Various properties of the coating film obtained from the composition were measured, likewise. The results are shown in Table 1.

EXAMPLE 3

Into the same apparatus as used in Example 1 are charged Sumiepoxy ELA-128 (118 g), terephthalic acid (20.9 g) and DMBA (0.07 g) and the mixture is reacted at 125° C. until the acid value of the reaction system becomes smaller than 1. The resulting mixture is dissolved in EGA (65 g), and thereto is added the same HEMA-semi-blocked TDI solution in EGA (98.3 g) are used in Example 1, at 85° C. over a period of 30 minutes, and the mixture is stirred at the same temperature for 4.5 hours, wherein the NCO of the product is nearly zero.

To the urethane-added epoxy resin mixture thus obtained are added MLB-1AE (65 g) and diethylamine (12.6 g), and the mixture is stirred at 75° C. for 7 hours, by which the acid value of the reaction mixture becomes 0.3.

To the resin composition thus obtained (370 g) are added DBTL (5.9 g), acetic acid (6.6 g) and deionized water to give a solution for electrocoating which has a solid content of 15% by weight.

Various properties of the coating film obtained from the composition were measured, likewise. The results are shown in Table 1.

EXAMPLE 4

Into one liter separable flask is charged MLB-1AM (82 g) and thereto are added an epoxy resin (Sumiepoxy ESA-011, a tradename of Sumitomo Chemical Co., Ltd., 290.8 g) and EGA (123 g), and further added diethylamine (21.7 g) and acrylic acid (19.0 g). The mixture is stirred under nitrogen gas at 100° C. for 4 hours, by which the acid value of the reaction mixture decreases to zero. To the reaction mixture is added ethyl cellosolve (18.9 g).

To the reaction mixture thus obtained (444 g) are added a completely blocked tolylene diisocyanate composition (208 g) and DBTL (3.5 g), and the mixture is mixed in a 2 liter vessel, and thereto are added acetic acid (15.7 g) and deionized water to give a solution for electrocoating which has a solid content of 15% by weight.

Various properties of the coating film obtained from the composition were measured, likewise. The results are shown in Table 1.

The completely blocked tolylene diisocyanate composition as used in the above Example 4 is prepared as follows.

Into a one liter flask provided with a stirrer, a thermometer, a condenser, an inert gas-introducing cock and a dropping funnel wherein air is replaced by nitrogen gas are charged TDI (174 g) and EGA (155.8 g), and thereto is added dropwise with stirring n-octyl alcohol (130 g) at an inner temperature of 25°–30° C. over a period of 1 hour. After the addition of n-octyl alcohol, the mixture is heated to 60° C. in 30 minutes and is stirred at 60° C. for 1.5 hour, by which the NCO of the product becomes 9.1% (measured by di-n-butylamine-hydrochloric acid titration method) and there is produced an isocyanate which is semi-blocked with n-octyl alcohol. The reaction mixture is cooled to 25° C., and is stirred at 25°–30° C., and thereto is added dropwise N-methyldiethanolamine (59.6 g) over a period of 1 hour. After the addition, the mixture is heated to 60° C. in 30 minutes and is stirred at 60° C. for 1.5 hours, by which the NCO of the product decreased to zero %. In the above semi-blocking and completely blocking reactions, when the blocking agent is added dropwise, significant heat generation is observed.

EXAMPLE 5

In the same manner as described in Example 1, Sumiepoxy ELA-128 (110 g), benzylamine (17.7 g) and EGA (60.4 g) are reacted under nitrogen gas at 105°–110° C. for 2 hours. It is confirmed by measuring the amount of oxirane oxygen that the reaction is almost completed. To the reaction mixture is added MLB-1AE (65.0 g), and the mixture is reacted at 90°–95° C. for 1 hour, by which the acid value of the reaction mixture becomes smaller than 1. To the mixture is further added acrylic acid (10.0 g), and the mixture is reacted at the same temperature until the acid value of the mixture becomes smaller than 1.

To the reaction mixture thus obtained is added the same semi-blocked tolylene diisocyanate solution in EGA (100 g) as used in Example 1, and the mixture is reacted at 90° C. for 3 hours.

To the resin composition thus obtained (360 g) are added DBTL (3.9 g), acetic acid (9.3 g) and deionized water to give a solution for electrocoating which has a solid content of 15% by weight.

Various properties of the coating film obtained from the composition thus obtained were measured, likewise. The results are shown in Table 1.

EXAMPLE 6

In the same manner as described in Example 1, Sumiepoxy ELA-128 (110 g), monoethanolamine (12.0 g) and EGA (56.5 g) are reacted under nitrogen atom at 90°–95° C. for 2 hours, and thereto are added MLB-3E (76.4 g) and phenothiazine (0.2 g), and the mixture is further reacted at 90°–95° C. until the acid value of the mixture becomes smaller than 1. To the mixture is further added acrylic acid (9.6 g), and the mixture is reacted at the same temperature until the acid value becomes smaller than 1.

To the reaction mixture thus obtained is added the same semi-blocked tolylene diisocyanate solution in EGA (102 g) as used in Example 1, and the mixture is reacted at 95° C. for 3 hours.

To the resin composition thus obtained (360 g) are added DBTL (7.3 g), acetic acid (7.4 g) and deionized water to give a solution for electrocoating which has a solid content of 15% by weight.

Various properties of the coating film obtained from the composition were measured, likewise. The results are shown in Table 1.

EXAMPLE 7

Into the same apparatus as used in Example 1 are charged Sumiepoxy ELA-128 (118 g) and bisphenol A (22.8 g) and the mixture is stirred at 150° C. for 5 hours. It is confirmed by measuring the amount of oxirane oxygen that the reaction is almost finished. The reaction product is added with urethane by reacting with the same HEMA-semiblocked TDI solution in EGA (78 g) as used in Example 1 under the same conditions as in Example 3. To the resulting reaction mixture are added MLB-1AE (65 g) and diethylamine (10.7 g), and the mixture is stirred at 75° C. for 8 hours, by which the acid value becomes smaller than 0.5.

To the resin composition thus obtained (350 g) are added DBTL (4.6 g), acetic acid (6.3 g) and deionized water to give a solution for electrocoating which has a solid content of 15% by weight.

Various properties of the coating film obtained from the composition were measured, likewise. The results are shown in Table 1.

EXAMPLE 8

In the same manner as described in Example 1, Sumiepoxy ESA-011 (35.5 g), Sumiepoxy ELA-128 (83 g), acrylic acid (7.2 g), cyanoacetic acid (19.0 g), MLB-1EE (65 g), diethylamine (15.0 g) and EGA (68.4 g) are reacted at 85°–90° C. for 6.5 hours, by which the acid value becomes smaller than 1.

The reaction product is reacted with the same HEMA-semi-blocked TDI solution in EGA (108 g) as used in Example 1 at 85° C. for 3 hours to give a urethane-added epoxy resin.

To the resin composition thus obtained (370 g) are added acetic acid (6.6 g) and deionized water to give a solution for electrocoating which has a solid content of 15% by weight.

Various properties of the coating film obtained from the composition were measured, likewise. The results are shown in Table 1.

EXAMPLE 9

Into a 500 ml separable flask provided with the same equipments as used in Example 1 are charged Sumiepoxy ELA-128 (120.5 g), benzylamine (11.4 g) and EGA (56.6 g), and the mixture is reacted under nitrogen gas at 90° C. for 2 hours. To the reaction mixture are added MLB-1E (65.3 g), diethylamine (7.3 g), EGA (12 g) and hydroquinone (0.05 g), and the mixture is reacted at 95° C. for 2 hours, by which the acid value becomes smaller than 1. To the reaction mixture are further added acrylic acid (20.7 g) and hydroquinone (0.5 g) and the mixture is reacted at 100° C. for 4 hours, by which the acid value becomes smaller than 1.

Separately, into a 100 ml four-necked flask is charged TDI (26.7 g), and thereto is added dropwise a mixture of N,N-diethylaminoethanol (18.0 g) and EGA (19.2 g)

under cooling to lower than 30° C. under nitrogen gas to give a semi-blocked TDI solution.

The semi-blocked TDI solution thus obtained is added dropwise to the liquid polybutadiene-modified epoxy resin composition obtained above, and the mixture is reacted at 65°–70° C. for 1.5 hour. To the reaction mixture is further added dropwise the same HEMA-semi-blocked TDI solution in EGA (43.4 g) as used in Example 1, and the mixture is reacted at 100° C. for 2 hours to give a homogeneous viscous resin composition.

To the resin composition thus obtained (370 g) is added DBTL (2.0), and the mixture is mixed well, and the mixture is neutralized with acetic acid (12.0 g) and thereto is added deionized water to give a homogeneous semi-transparent solution for electrocoating.

Various properties of the coating film obtained from the composition were measured, likewise. The results are shown in Table 1.

Reference Example 1

In the same manner as described in Example 1, Sumiepoxy ESA-011 (150 g), diethylamine (15.8 g), acrylic acid (7.2 g), hydroquinone (0.5 g) and EGA (74 g) are reacted with stirring at 100° C. for 3.5 hours, by which the acid value of the reaction mixture becomes 1.4. To the reaction mixture is added dropwise with stirring the same HEMA-semi-blocked TDI solution in EGA (137 g) as used in Example 1 at 80° C. over a period of about 30 minutes, and the mixture is further stirred at 100° C. for 3 hours.

To the resin composition thus obtained are added DBTL (8.2 g), acetic acid (7.5 g) and deionized water to give a solution for electrocoating which has a solid content of 15% by weight.

Reference Example 2

Into a 500 ml separable flask provided with a stirrer, a thermometer, a condenser and a nitrogen gasintroducing cock are charged the liquid maleinated polybutadiene (MLB-1, 200 g) and EGA (54 g), and the mixture is stirred under nitrogen gas.

To the mixture is added dimethylaminopropylamine (20.8 g, molar equivalent to maleic anhydride which is added to the liquid polybutadiene), and the mixture is reacted at 130° C. for 2 hours (until the acid value of the reaction mixture becomes smaller than 1) to give an imidated product.

To the reaction product obtained above (200 g) is added acetic acid (5.8 g), by which the tertiary amino group in the imido group is neutralized, to give a resin solution having a solid content of 80% by weight.

To the resin solution is added pure water (1,400 ml) to give a solution for electrocoating which has a solid content of 10% by weight.

Reference Example 3

To a modified resin solution (457 g) prepared in the same manner as described in Reference Example 1 (a modified resin solution in EGA which is urethane-added with HEMA-semi-blocked TDI, solid content: 70% by weight) is added with stirring acetic acid (8.9 g).

To the resulting mixture are added the same resin solution (solid content: 80% by weight, 100 g) as prepared in Reference Example 2 and DBTL (9.8 g), and the mixture is mixed well, and therto is added deionized water to give a homogeneous solution for electrocoating which has a solid content of 15% by weight.

The solutions for electrocoating obtained in Reference Examples 1, 2 and 3 were subjected to the electrocoating under the conditions as described in Table 1, and various properties of the coating films obtained therefrom were measured. The results are shown in Table 1.

TABLE 1

| Example No. of electro-coating solution | Conditions for electrocoating*1 | | | | Properties of the coating film | | | | | |
|---|---|---|---|---|---|---|---|---|---|---|
| | Dispersibility | Voltage for coating (V) | Time for coating (min) | Baking (°C. × min) | Thickness of coating film (μ) | Pencil hardness | Appearance | Erichsen test (mm) | Impact strength (cm) *2 | Water resistance (day) *3 | Anticorrosion (hour) *4 |
| Example 1 | Excellent | 170 | 3 | 160 × 20 | 20 | 3H | ◉ | More than 8 | More than 50 | 20 (Good) | 240 |
| Example 2 | Excellent | 180 | " | 180 × 20 | " | " | " | More than 8 | More than 50 | 20 (Good) | 192 |
| Example 3 | Excellent | 130 | " | 180 × 20 | " | " | " | More than 8 | More than 50 | 20 (Good) | 192 |
| Example 4 | Excellent | 150 | " | 180 × 20 | " | " | " | More than 8 | More than 50 | 20 (Good) | 144 |
| Example 5 | Excellent | 160 | " | 160 × 20 | " | 2H | " | More than 8 | More than 50 | 20 (Good) | 240 |
| Example 6 | Excellent | 150 | " | 180 × 20 | " | 4H | " | More than 8 | More than 50 | 20 (Good) | 192 |
| Example 7 | Excellent | 200 | " | 180 × 20 | " | " | " | More than 8 | More than 50 | 20 (Good) | 192 |
| Example 8 | Excellent | 180 | " | 180 × 20 | " | 3H | " | More than 8 | More than 50 | 20 (Good) | 240 |
| Example 9 | Excellent | 180 | " | 180 × 20 | " | 4H | " | More than 8 | More than 50 | 20 (Good) | 240 |
| Reference Example 1 | Excellent | 50 | 3 | 180 × 20 | 20 | 3H | ◉ | 3 | 20 | 10 | 72 |
| Reference Example 2 | Excellent | " | " | 180 × 20 | " | F | o | More than 8 | More than 50 | 15 | 24 |
| Reference Example 3 | Excellent | " | " | 180 | " | 2H | x | 5 | 20 | 20 | 48 |

TABLE 1-continued

| | Conditions for electrocoating*1 | | | | Properties of the coating film | | | | | |
|---|---|---|---|---|---|---|---|---|---|---|
| Example No. of electro-coating solution | Disper-sibility | Voltage for coating (V) | Time for coat-ing (min) | Baking (°C. × min) | Thickness of coating film (μ) | Pencil hard-ness | Appear-ance | Erichsen test (mm) | Impact strength (cm) *2 | Water resist-ance (day) *3 | Anti-corro-sion (hour) *4 |
| | lent | | | × 20 | | | | | | (Good) | |

[Remarks]:
*1 The electrocoating was carried out by using base plate: a cold rolled steel sheet, Lightdull (SPCC-D), as described in JIS G-3141, anode: carbon plate, space of eletrodes: 10 cm, and ratio of eletrodes: 1/1.
*2 Impact strength by Du Pont impact test.
*3 It is shown by number of days until abnormal pheneomena such as blister is observed on the coating film when dipped in water at 40° C.
*4 The anti-corrosion test was carried out by spraying a 5% NaCl aqueous solution to the coating film which was crosscut on the surface at atmosphere of 35° C. for a fixed time, cleaning the surface of the coating film, adhering an adhesive tape thereon and then peeling off the tape, and observing the state of peeling of the coating film. The data are shown by the time of spraying of NaCl solution when the coating film was peeled off in the width of 2 mm (one side) from the crosscut part.

What is claimed is:

1. A resin composition for electrocoating, which comprises
(I) a reaction product (G) of 100 parts by weight of an epoxy compound (E) and 5 to 200 parts by weight of a partially esterified and/or partially amidated product (D) which is obtained by partially esterifying and/or partially amidating an adduct (A) of a conjugated diene polymer having a number average molecular weight of 150 to 50,000 with an α,β-unsaturated dicarboxylic acid or its anhydride, wherein said α,β-unsaturated dicarboxylic acid or its anhydride is used in an amount such that the content of the dicarboxylic acid in the adduct (A) becomes 5 to 25% by weight based on the total weight of the adduct (A), with an alcoholic hydroxy group-containing compound (B) and/or a primary or secondary monoamine (C), respectively, said compound (B) and monoamine (C) being used in an amount such that the sum of the molar number of the compound (B) and that of the monoamine (C) becomes 0.7 to 1.2 mol per 1 mol of the α,β-unsaturated dicarboxylic acid or its anhydride, and
(II) a completely blocked organic polyisocyanate in an amount of 5 to 200 parts by weight to 100 parts by weight of the reaction product (G), said mixture of the reaction product (G) and the completely blocked organic polyisocyanate being neutralized.

2. A resin composition according to claim 1, wherein the reaction product (G) is a product obtained by the reaction of the epoxy compound (E) and the partially esterified and/or partially amidated product (D) in the presence of an epoxy group-modifying agent (F) selected from the group consisting of a primary and secondary amine, a dicarboxylic acid, a monocarboxylic acid and a bifunctional phenolic hydroxy group-containing compound, said agent (F) being used in an amount that the active hydrogen of the epoxy group-modifying agent becomes 0.2 to 1.0 atomic equivalent per one equivalent of the epoxy group of the epoxy compound (E).

3. A resin composition according to claim 2, wherein the epoxy compound (E) is a compound having two epoxy groups in the molecule.

4. A resin composition according to claim 2, wherein the amount of the epoxy group-modifying agent (F) is in the range that the active hydrogen of the epoxy group-modifying agent becomes 0.5 to 1.0 atomic equivalent per one equivalent of the epoxy group of the epoxy compound (E).

5. A resin composition according to claim 1, wherein the mixture of the reaction product (G) and the completely blocked organic polyisocyanate before neutralization has an amine value of 10 to 150.

6. A resin composition for electrocoating which comprises a neutralized product of an adduct (H) of
(I) a reaction product (G) of 100 parts by weight of an epoxy compound (E) and 5 to 200 parts by weight of a partially esterified and/or partially amidated product (D) which is obtained by partially esterifying and/or partially amidating an adduct (A) of a conjugated diene polymer having a number average molecular weight of 150 to 50,000 with an α,β-unsaturated dicarboxylic acid or its anhydride, wherein said α,β-unsaturated dicarboxylic acid or its anhydride is used in an amount such that the content of the dicarboxylic acid in the adduct (A) becomes 5 to 25% by weight based on the total weight of the adduct (A), with an alcoholic hydroxy group-containing compound (B) and/or a primary or secondary monoamine (C), respectively, said compound (B) and monoamine (C) being used in an amount such that the sum of the molar number of the compound (B) and that of the monoamine (C) becomes 0.7 to 1.2 mol per 1 mol of the α,β-unsaturated dicarboxylic acid or its anhydride, with
(II) a partially blocked organic polyisocyanate in an amount of 5 to 300 parts by weight to 100 parts by weight of the reaction product (G).

7. A resin composition according to claim 6, wherein the reaction product (G) is a product obtained by the reaction of the epoxy compound (E) and the partially esterified and/or partially amidated product (D) in the presence of an epoxy group-modifying agent (F) selected from the group consisting of a primary and secondary amine, a dicarboxylic acid, a monocarboxylic acid, and a bifunctional phenolic hydroxy group-containing compound, said agent (F) being used in an amount that the active hydrogen of the epoxy group-modifying agent becomes 0.2 to 1.0 atomic equivalent per one equivalent of the epoxy group of the epoxy compound (E).

8. A resin composition according to claim 7, wherein the epoxy compound (E) is a compound having two epoxy groups in the molecule.

9. A resin composition according to claim 7, wherein the amount of the epoxy group-modifying agent (F) is in the range that the active hydrogen of the epoxy group-modifying agent becomes 0.5 to 1.0 atomic equivalent per one equivalent of the epoxy group of the epoxy compound (E).

10. A resin composition according to claim 6, wherein the adduct (H) of the reaction product (G) with the partially blocked organic polyisocyanate has an amine value of 10 to 150.

* * * * *